United States Patent [19]

Eslinger

[11] Patent Number: 4,989,469
[45] Date of Patent: Feb. 5, 1991

[54] ECCENTRIC GEAR PUMP AND DRIVE MECHANISM THEREFOR

[75] Inventor: David Eslinger, Duncan, Okla.
[73] Assignee: Halliburton Company, Duncan, Okla.
[21] Appl. No.: 398,357
[22] Filed: Aug. 24, 1989
[51] Int. Cl.$^5$ .................. F16H 21/18; F16H 57/04
[52] U.S. Cl. ............................. 74/25; 74/467; 417/374
[58] Field of Search ................ 74/25, 437, 467; 417/374

[56] References Cited

U.S. PATENT DOCUMENTS

| | | | |
|---|---|---|---|
| 293,952 | 2/1884 | Conrad | 74/25 X |
| 1,223,283 | 4/1917 | Kurtz | 74/25 |
| 1,318,130 | 10/1919 | Barton | 74/25 |
| 1,568,430 | 1/1926 | Uhl | 74/25 |
| 2,325,713 | 9/1943 | Simons | 74/25 X |
| 2,445,133 | 7/1948 | Cruikshank | 74/25 |
| 2,534,428 | 12/1950 | Cruikshank | 74/25 |
| 3,516,267 | 6/1970 | Uhlir | 66/56 |
| 3,658,001 | 4/1972 | Seybold | 101/350 |
| 3,834,242 | 9/1974 | Seybold | 74/25 |
| 4,078,439 | 3/1978 | Iturriaga-Notario | 74/53 |
| 4,465,042 | 8/1984 | Bristol | 123/197 R |

FOREIGN PATENT DOCUMENTS 916273 1/1963 United Kingdom ............. 74/25

OTHER PUBLICATIONS

Halliburton Services Sales & Service Catalog No. 43, published in 1985, pp. 2414, 2415 and 2418-2421.

Primary Examiner—Allan D. Herrmann
Attorney, Agent, or Firm—James P. Duzan; Neal R. Kennedy

[57] ABSTRACT

An eccentric gear pump for use in pumping a variety of fluids. The pump has conventional plungers reciprocably positioned in a cylinder and includes a drive case with a rotatable drive shaft therein. The driven shaft is connected eccentrically to drive gears in a plurality of gear assemblies. Each gear assembly also includes a driven gear which has a yoke assembly eccentrically connected thereto. The yoke assembly is connected to a corresponding plunger. Rotation of the drive gear results in rotation of the driven gear which in turn causes reciprocation of the yoke assembly and plunger. Cam rollers are attached to opposite sides of the driven gear, and the cam rollers ride closely within a cam groove in a cam track on opposite sides of each driven gear. The interaction of the cam roller and the cam groove limits movement of the yoke assembly and piston to substantially purely reciprocal motion with respect to the drive case. Each gear assembly includes a pressure lubricated gear case.

21 Claims, 6 Drawing Sheets

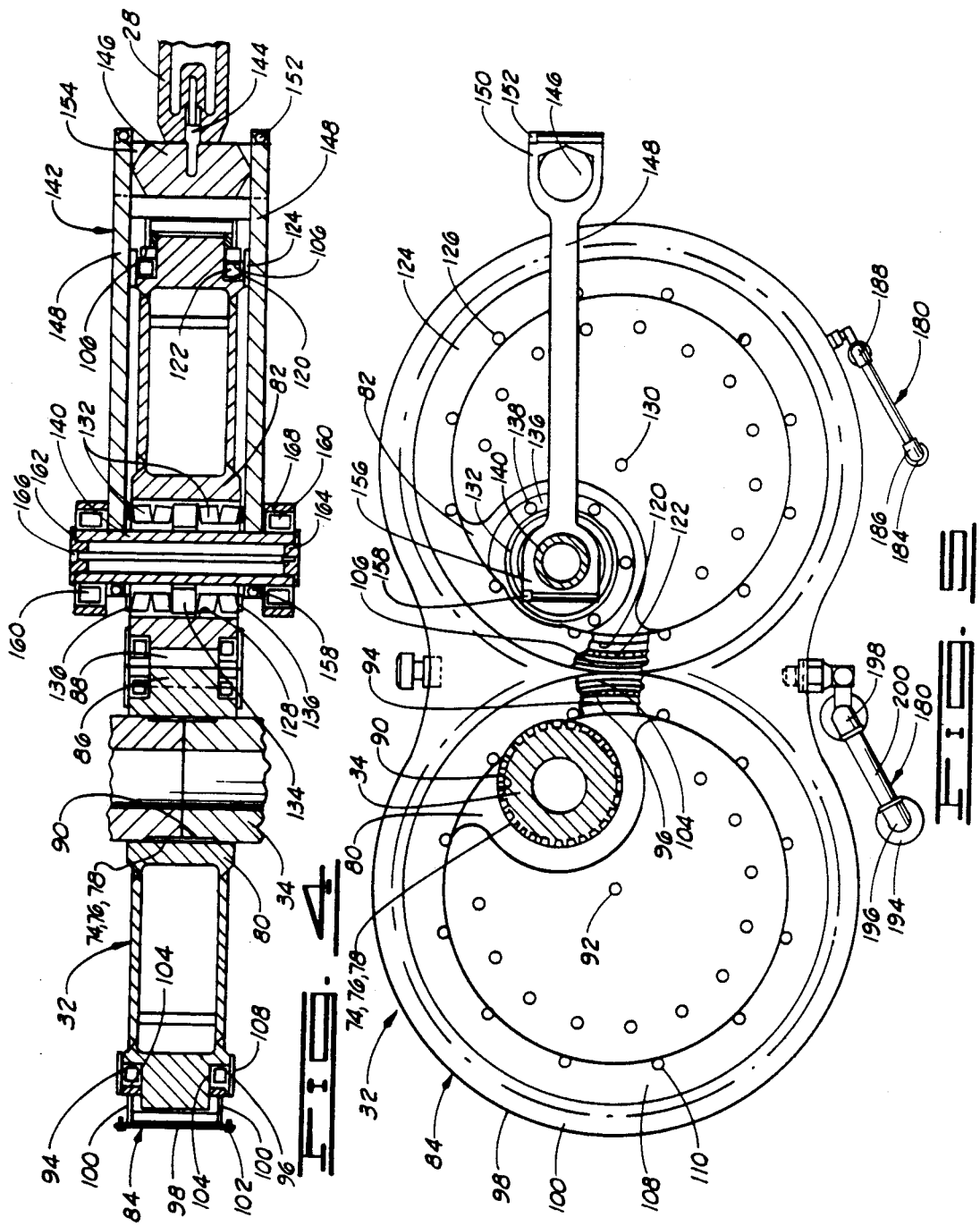

ECCENTRIC GEAR PUMP AND DRIVE MECHANISM THEREFOR

BACKGROUND OF THE INVENTION

1. Field Of The Invention

This invention relates to reciprocating pumps, and more particularly, to a pump having an eccentric gear drive mechanism with cam rollers positioned on an output shaft and engaging a cam roller track for guidance thereof.

2. Brief Description Of The Prior Art

Reciprocating, plunger type pumps are well known in the art, and such pumps typically use a crankshaft, connecting rods and crossheads to actuate the plungers. A typical example of such a pump is the Halliburton HT-400 which is used as a multi-purpose pump for a variety of drilling fluids, including drilling muds. Conventional reciprocating pumps have well known unbalanced forces which require a substantial structure to support the pump and its drive mechanism. The eccentric gear mechanism of the present invention provides a design in which the kinematics are such that it is possible to use a lighter weight support structure than with a conventional crankshaft driven pump of similar horsepower and plunger load capacity.

Crankshaft driven pumps generally require the use of journal bearings which are between the connecting rods and crankshaft. This is avoided in the present invention because the eccentric gear design allows ball or roller bearing mounting of the gears. The sliding contact of the prior art pump crosshead within its crosshead guide is eliminated because no crosshead is required for the eccentric gear design. Thus, major areas of wear in conventional pumps are eliminated with the present invention.

Another factor in the design of conventional, crankshaft driven pumps is that when a long stroke is required, corresponding longer throws on the crankshaft are necessary. In the present invention with the dual eccentric gear design, the displacement comes from each of a set of gears rather than from one crankshaft throw. Thus, a more compact structure is possible than with conventional pumps of the same stroke. The pump of the present invention therefore solves many of the problems and addresses the limitations of conventional pumps.

U.S. Pat. No. 2,534,428 discloses a power jack for pumps with gears mounted in a gear wheel mounting member. Each of the gears has an annular groove or guideway in the outer periphery thereof. The gear wheel mounting member has two apertures and is split so that it can be placed in the guideways in the gears. The inside diameters of the apertures act as bearings in which the outwardly facing surfaces of the grooves and the gears rotate. During rotation, the drive shaft remains fixed vertically and horizontally. In an alternate embodiment, the gear wheel mounting member totally encloses the gear wheels. Extending transversely on the gears are "marginal portions" which form annular shoulders or guideways on both sides of the gear teeth. These guideways are received in apertures in the mounting member which act as bearings. In the present invention, a somewhat similar arrangement is used, but roller or ball bearings are provided on the gears. Further, the present invention includes a cam roller engaged with a cam roller track for support and guiding of the apparatus, a feature which is not shown in Cruikshank.

U.S. Pat. No. 1,318,130 to Barton discloses a vertically reciprocating pump having a pair of elliptical gears which are intermeshed to reciprocate a frame of a pump. An obvious problem with this mechanism is that such eccentric shaped gears would be much more difficult to make than the circular gears of the present invention or Cruikshank. In Barton, upright portions of the reciprocating frame have slots therein which are guided on the drive shaft. The gears have a shroud portion on opposite sides of the two portions thereof, and these shrouds act as cam surfaces on which the two gears ride.

SUMMARY OF THE INVENTION

The present invention includes a drive mechanism which is particularly well adapted for use with a reciprocating plunger pump and comprises a first gear, a first shaft engaged eccentrically with the first gear, a second gear meshingly engaged with the first gear, a second shaft engaged eccentrically with the second gear, a cam guide means such as a cam track positioned adjacent to the second gear, and a cam on the second shaft which is in guided engagement with the cam guide means. The first shaft is rotatable about a fixed axis. The cam preferably includes a cam roller for rolling along a surface of the cam track. Preferably, the cam track is one of a pair of such cam tracks disposed on opposite sides of the second gear, and the cam is one of a pair of cams disposed on opposite ends of the second shaft.

Each of the gears preferably has an annular shoulder thereon, and the mechanism further comprises a side plate defining a pair of spaced openings therein, each of the openings being adapted for receiving a shoulder of a corresponding gear therein. The side plate is preferably one of a pair of such plates disposed on opposite sides of the gears and forming a portion of a gear case which at least partially encloses the gears. In one embodiment, a ball or roller bearing is positioned in each of the openings for engagement and support of the shoulder of the corresponding gear.

When used in a reciprocating pump, the drive mechanism is installed in a gear case portion of the pump. The pump further comprises a cylinder connected to the gear case, a plunger reciprocably disposed in the cylinder, and means for connecting the plunger to the second shaft of the drive mechanism. This means may be characterized by a yoke comprising a pair of arms pivotally connected to opposite ends of the second shaft and a cross member extending between the arms and connected to the plunger.

Thus, the reciprocating pump of the present invention may also be said to comprise a drive case, a drive shaft disposed in the drive case and having a portion extending therefrom, a cylinder connected to the drive case, a first eccentric gear disposed in the drive case and engaged with the drive shaft such that the first eccentric gear is rotatable therewith, a second eccentric gear disposed in the drive case and enmeshed with the first gear, a yoke pin engaged with the second eccentric gear, a plunger reciprocably disposed in the cylinder, and a yoke interconnecting the plunger and the yoke pin. The arms of the yoke extend on opposite sides of the second eccentric gear and are attached to the yoke pin. The cross member interconnects the arms and the plunger.

The reciprocating pump of the present invention may be further described as comprising a drive case, a cylinder connected to the drive case, a plunger reciprocably disposed in the cylinder, a drive shaft rotatably disposed in the drive case, a pair of enmeshed gears, one of the gears being eccentrically engaged by the drive shaft, a second shaft eccentrically engaging the other of the gears, means for connecting the second shaft and the plunger, a gear case at least partially enclosing the gears, and a lubrication line in communication with the gear case and connectable to a lubrication source. In one embodiment, the lubrication line is flexible, and in another embodiment, the line has at least one swivel connection therein. The pump further comprises means for substantially maintaining the axes of the drive shaft and the second shaft in a single plane and further comprises means for maintaining a substantially constant spacing between central axes of the gears.

An important object of the present invention is to provide a reciprocating pump having an eccentric gear drive mechanism therein.

Another object of the invention is to provide such a gear drive mechanism for a reciprocating pump used in pumping a variety of fluids.

A further object of the invention is to provide a drive mechanism having a pair of eccentric gears and a cam on one of the gears which is in engagement with a cam guide means.

Still another object of the invention is to provide an eccentric gear pump having a yoke assembly interconnecting one of the gears and a plunger of the pump.

An additional object of the invention is to provide an eccentric gear pump with a gear assembly at least partially enclosed in a gear case to which a lubricating fluid may be directed.

Additional objects and advantages of the invention will become apparent as the following detailed description of the preferred embodiment is read in conjunction with the drawings which illustrate such preferred embodiment.

BRIEF DESCRIPTION OF THE DRAWINGS

FIG. 4 is an enlarged cross-sectional view of one gear and yoke assembly shown in FIG. 2.

FIG. 5 is a partial cross section taken along lines 5—5 in FIG. 2 and showing a gear case assembly with most other components omitted for clarity.

DESCRIPTION OF THE PREFERRED EMBODIMENT

Figure 1:
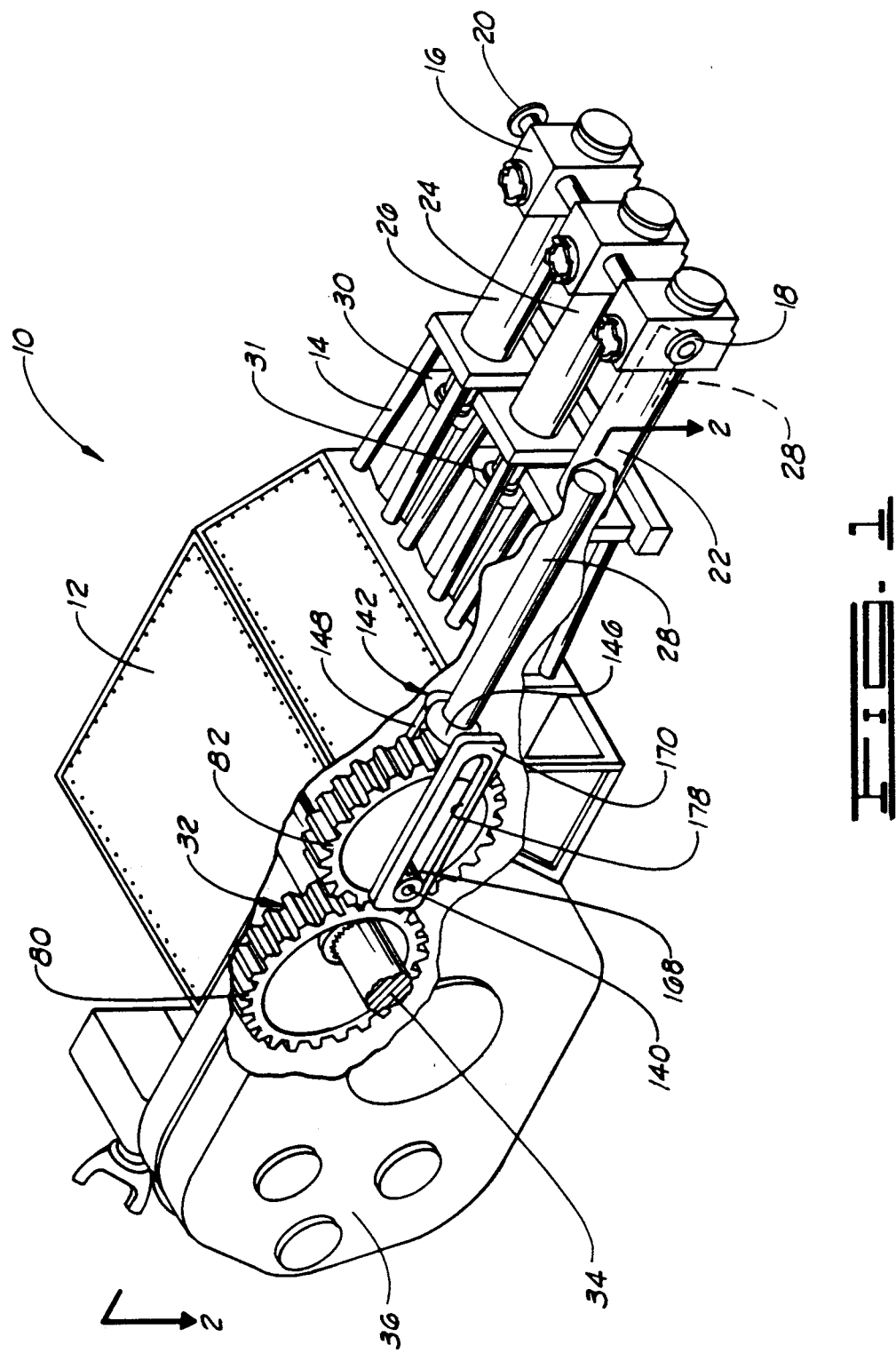
FIG. 1 shows a perspective, partial cutaway view of the pump of the present invention.

Referring now to the drawings, and more particularly to FIG. 1, the eccentric gear pump of the present invention is shown and generally designated by the numeral 10. Pump 10 generally includes a drive case 12, a packing housing 14 and a cylinder 16. Packing housing 14 and cylinder 16 are of a kind known in the art. Cylinder 16 has a fluid inlet 18 and a fluid outlet 20. In the embodiment shown, cylinder 16 has three sections 22, 24 and 26, although the invention is not intended to be limited to three cylinder sections. A plunger 28 is reciprocably disposed in each cylinder section 22, 24 or 26 and provides pumping of fluid in a manner known in the art. A packing assembly 30 provides packing means 31 for sealingly engaging each plunger 28, also in a manner known in the art.

Disposed in drive case 12 are a plurality of eccentric gear assemblies 32 which are used to drive and reciprocate plungers 28. There is a gear assembly 32 for each plunger 28, and each gear assembly is connected to, and driven by, a drive shaft 34. Drive shaft 34 may be referred to as a first shaft in gear assembly 32. The details of gear assemblies 32 will be discussed in more detail herein.

Drive shaft 34 extends outwardly from drive case 12 and may be rotatably driven by any manner known in the art, such as through a right angle gear drive assembly 36.

Figure 2:
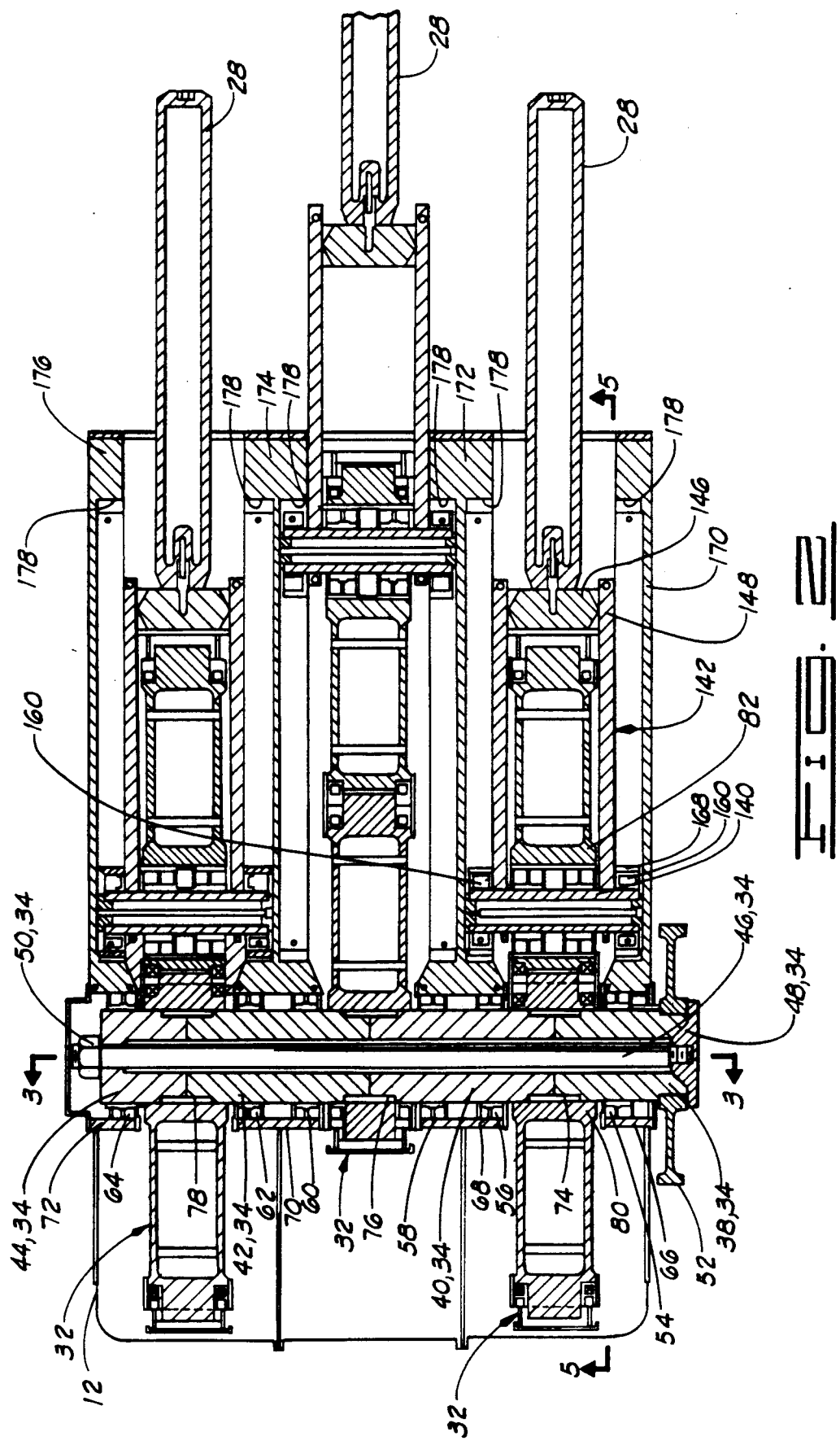
FIG. 2 is a partial cross section taken longitudinally along lines 2—2 in FIG. 1 and showing the power end of the pump.

Referring now primarily to FIG. 2, and also in part to FIG. 3, details of drive case 12 and the components therein, including gear assemblies 32, will be discussed. In the embodiment shown, drive shaft 34 is segmented and includes a drive portion 38, intermediate portions 40 and 42, and an end portion 44. A stud 46 extends through drive portion 38, intermediate portions 40 and 42 and end portion 44, and the stud is threadingly engaged with a cap 48 adjacent to drive portion 38 and a nut 50 adjacent to end portion 44.

A pulley, gear or sheave 52 is engaged with drive portion 38 of drive shaft 34. Pulley, gear or sheave 52 is further engaged with the drive mechanism (not shown) in gear drive assembly 36 in a manner known in the art.

Drive portion 38 of drive shaft 34 is rotatably supported in drive case 12 by a main bearing 54. Main bearing 54 is preferably a spherical roller bearing, but other bearing types may be used. Intermediate portion 40 of drive shaft 34 is similarly supported by a pair of spaced main bearings 56 and 58, and intermediate portion 42 is supported on spaced main bearings 60 and 62. Finally, end portion 44 of drive shaft 34 is supported on a main bearing 64. A main bearing cap or main plate 66 holds main bearing 54 in place in drive case 12, a main bearing cap or main plate 68 holds main bearings 56 and 58 in place, a main bearing cap or main plate 70 holds main bearings 60 and 62 in place, and a main bearing cap or main plate 72 holds main bearing 64 in place.

Drive portion 38 and intermediate portion 40 of drive shaft 34 form a splined portion 74. Similarly, intermediate portions 40 and 42 form a splined portion 76, and intermediate portion 42 and end portion 44 form a splined portion 78.

Referring now to FIGS. 4 and 5, details of gear assemblies 32 and the engagement therewith by drive shaft 34 will be discussed. Each gear assembly 32 generally includes a first, drive gear 80 which is engaged with a second, driven gear 82. Both gears 80 and 82 are disposed in a gear case 84. Drive gear 80 has a plurality of teeth 86 on a circumference thereof which are meshed with similar teeth 88 on driven gear 82. The configuration of teeth 86 and 88 may be of any kind generally known in the art.

Drive gear 80 defines a splined opening 90 which is eccentrically spaced from center 92 of the drive gear, as best seen in FIG. 5. Splined opening 90 is adapted for engagement with any one of splined portions 74, 76 or 78 of drive shaft 34. It will be seen by those skilled in the art that drive gear 80 is eccentrically rotated about the axis of drive shaft 34. That is, the axis of rotation of drive shaft 34 is the axis of rotation of drive gear 80. Drive gear 80 may therefore be referred to as an eccentric gear.

Drive gear 80 has outwardly facing, annular shoulders 94 on opposite sides thereof. The inner race of a gear bearing 96 is disposed on each shoulder 94. Gear bearings 96 are preferably roller bearings although ball bearings could also be used.

Gear case 84 has an outer, circumferential portion 98 which extends around teeth 86 and 88 on drive gear 80 and driven gear 82 in a somewhat figure eight configuration. On each side of outer portion 98 is a side plate 100 attached by fastening means such as screws 102. Each side plate 100 defines a pair of spaced bores 104 and 106 therethrough. Bores 104 and 106 in one side plate 100 are aligned with the corresponding bores in the side plate on the opposite side of gears 80 and 82.

The outer race of gear bearing 96 is positioned in bore 104 in the corresponding side plate 100 of gear case 84. A bearing retainer or cover 108 retains gear bearing 96 in position. Bearing cover 108 is attached to drive gear 80 by fastening means such as screws 110. It will thus be seen that drive gear 80 is rotatably supported in gear case 84 by gear bearings 96. Bearing covers 108 rotate with drive gear 80.

Similar to drive gear 80, driven gear 82 has an outwardly facing annular shoulder 120 on each side thereof. The inner race of a gear bearing 122 is positioned on each shoulder 120. The outer race of gear bearing 122 is disposed in bore 106 of the corresponding side plate 100 of gear case 84. A bearing retainer or cover 124 holds each gear bearing 122 in place and is attached to driven gear 82 by a fastening means, such as screws 126. It will thus be seen that driven gear 82 is rotatably supported in bores 106 of opposite side plates 100 of gear case 84 in a manner substantially similar to the support of drive gear 80. Preferably, gear bearings 96 and 122 are identical, and bearing covers 108 and 124 are identical, although this is not necessary.

Driven gear 82 defines a bore 128 eccentrically spaced from center 30 of the gear. Thus, driven gear 82 may also be referred to as an eccentric gear. A pair of yoke pin bearings 132 are disposed in bore 128. A spacer 134 is preferably positioned between bearings 132. Yoke pin bearings 132 are preferably spherical roller bearings although other bearing types would also be applicable.

A bearing retainer or cover 136 is disposed on each side of driven gear 82 and holds the corresponding yoke pin bearing 132 in place. Each bearing cover 136 is attached to driven gear 82 by a fastening means, such as screws 138.

An elongated yoke pin or shaft 140 is disposed through the inner races of yoke pin bearings 132 and thus pivotally engaged with driven gear 82. Yoke pin 140 may be referred to as a second shaft in gear assembly 32. As best seen in FIG. 4, yoke pin 140 extends outwardly from both sides of driven gear 82.

Still referring to FIG. 4, each plunger 28 is attached to a yoke assembly 142 by a connecting means such as stud 144. Yoke assembly 142 includes a cross member 146 and a pair of elongated arms 148 which extend longitudinally away from plunger 28. Each arm 148 has a first, split end 150 through which a portion of cross member 146 extends. A bolt 152 is used to clamp each first end 150 on cross member 146. Arms 148 may be more rigidly attached to cross member 146 by any conventional means, such as weld 154.

Each arm 148 has a second, split end through which yoke pin 140 is disposed. Each second end 156 is clamped on yoke pin 140 by a clamping means, such as bolt 158.

Referring now to FIGS. 2 and 4, the inner race of a cam bearing 160 is disposed on each outwardly extending end of yoke pin 140 at a position outwardly from arms 148 of yoke assembly 142. Cam bearings 160 are preferably roller bearings, but again, the invention is not intended to be so limited. Cam bearings 160 are held in place on yoke pin 140 by bearing retainers 162 and 164. Bearing retainers 162 and 164 are attached to one another by an elongated bolt 166.

A cam roller 168 is positioned on the outer race of each cam bearing 160.

As seen in FIG. 2, drive case 12 includes cam track portions 170, 172, 174 and 176. See also FIG. 1. Cam track 170 defines a cam groove 178 therein. Cam track 176 is substantially a mirror image of cam track 170 and also defines a cam groove 178 therein. Further, each of cam tracks 172 and 174 defines a pair of cam grooves 178 therein. A cam roller 168 is disposed in each cam groove 178 and moves therein, thus providing a cam guide means in a manner further described herein. The diameter of cam roller 168 is slightly smaller than the width of cam groove 178 so that the cam roller will roll in the groove while the groove guides the roller.

Referring again to FIGS. 3 and 5, a lubrication system 180 is connected to drive case 12 and each of gear cases 84. Lubrication system 180 directs lubricating oil to the inside of each of gear cases 84 from a lubrication source (not shown).

Figure 3:
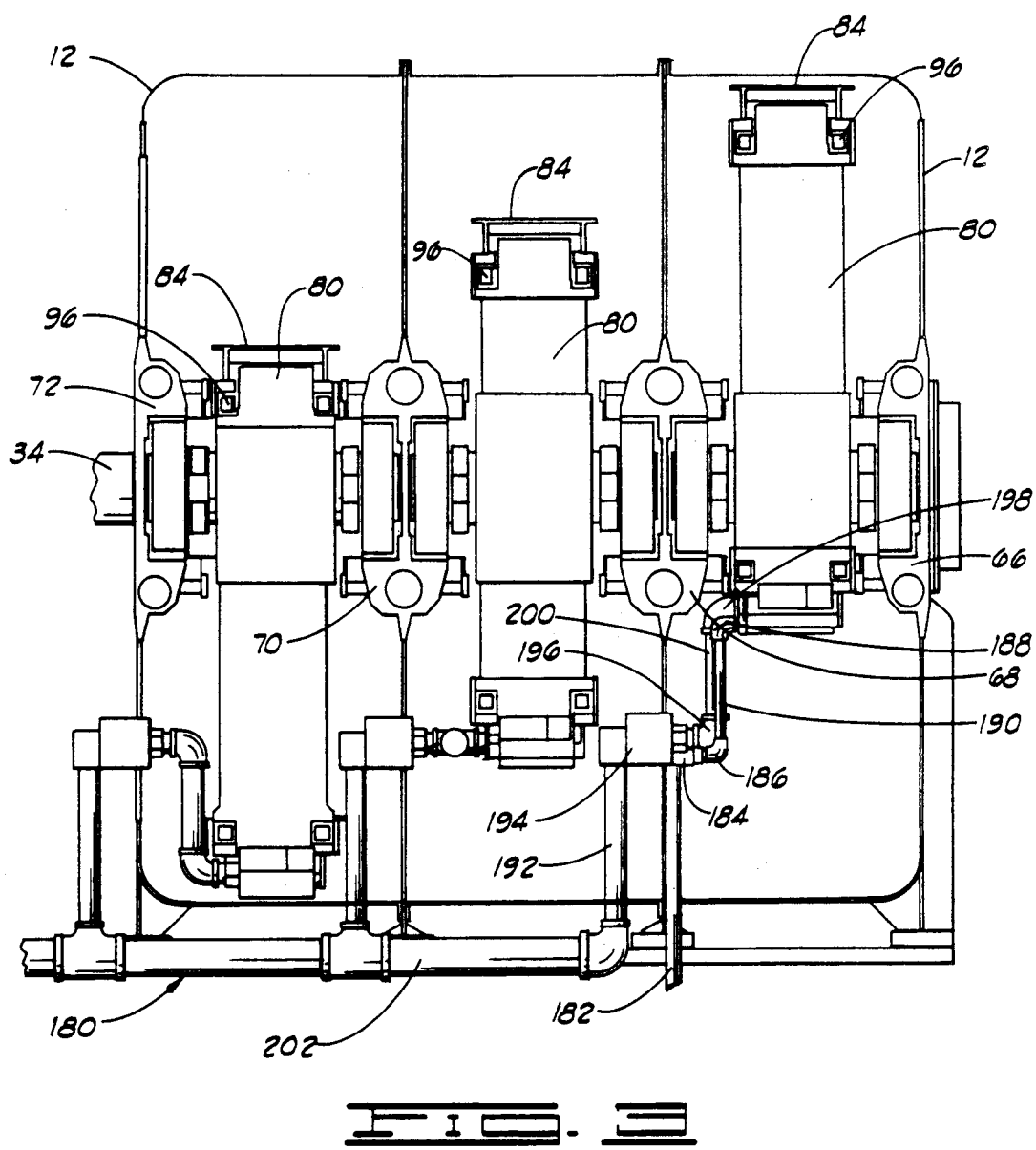
FIG. 3 is a partial cross section taken along lines 3—3 in FIG. 2 with the gear case assemblies shown in elevation.

Referring to the right side of FIG. 3, an inlet line 182 is connected to a distribution block 184. Inlet line 182 may be manifolded to other such inlet lines. A swivel fitting 186 is connected to block 184 and a similar swivel fitting 188 is connected to the corresponding gear case 84. A line 190 interconnects swivel fittings 186 and 188.

In a similar manner, an outlet line 192 is connected to a distribution block 194. A swivel fitting 196 is connected to distribution block 194, and a similar swivel fitting 198 is connected to the corresponding gear case 84. A line 200 interconnects swivel fittings 196 and 198. Outlet line 192 is connected to an outlet manifold 202.

Similar connections are made to each of the other gear cases 84, although the inlet components are not shown for the left and center gear cases 84 in FIG. 3. These are merely omitted for clarity of the drawing.

Distribution blocks 184 and 194 are fixed and spaced from the connection points on gear case 84 at a distance equal to the distance between the center of drive shaft 34 and center 92 of drive gear 80. As will be further discussed herein, it will become apparent that as drive gear 80 is rotated, gear case 84 will also move. In this movement, gear case 84 rotates about the center of distribution blocks 184 and 194. The swivel fittings insure that a fluid connection is always maintained between gear case 84 and the distribution blocks.

Figure 3A:
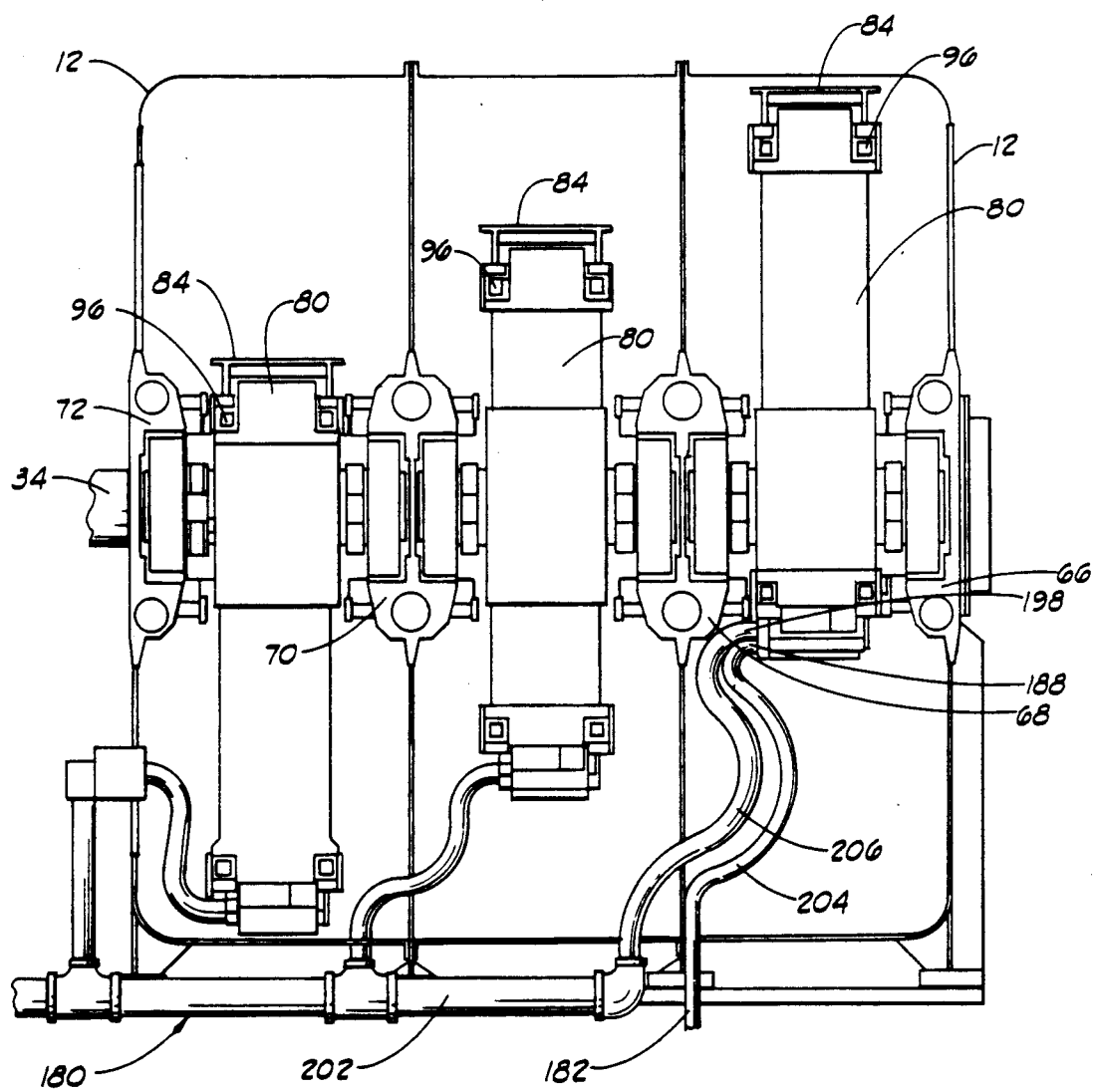
FIG. 3A is a partial cross section of an alternate embodiment taken along lines 3—3 in FIG. 2 with the gear case assemblies shown in elevation.

The embodiment of lubrication system 180 just described is somewhat complex and requires a number of connections. A simplified second embodiment is shown in FIG. 3A and includes flexible inlet line 204 and flexible outlet line 206. These flexible lines are connected to gear case 84 and to drive case 12 and simply flexibly move as gear case 84 is rotated in drive case 12.

OPERATION OF THE INVENTION

Figure 6A:
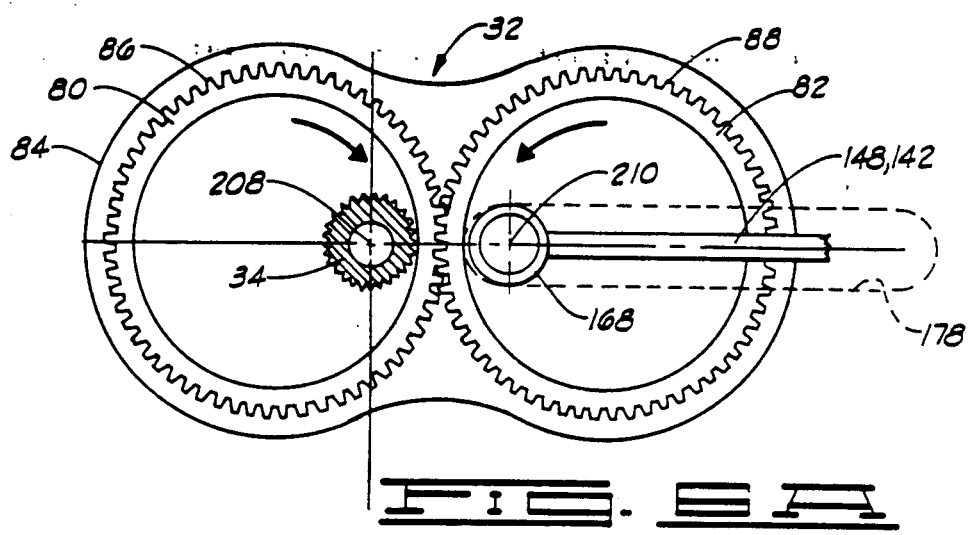
FIGS. 6A–6C illustrate relative gear positions at various angles of rotation of the drive shaft.
Figure 6B:
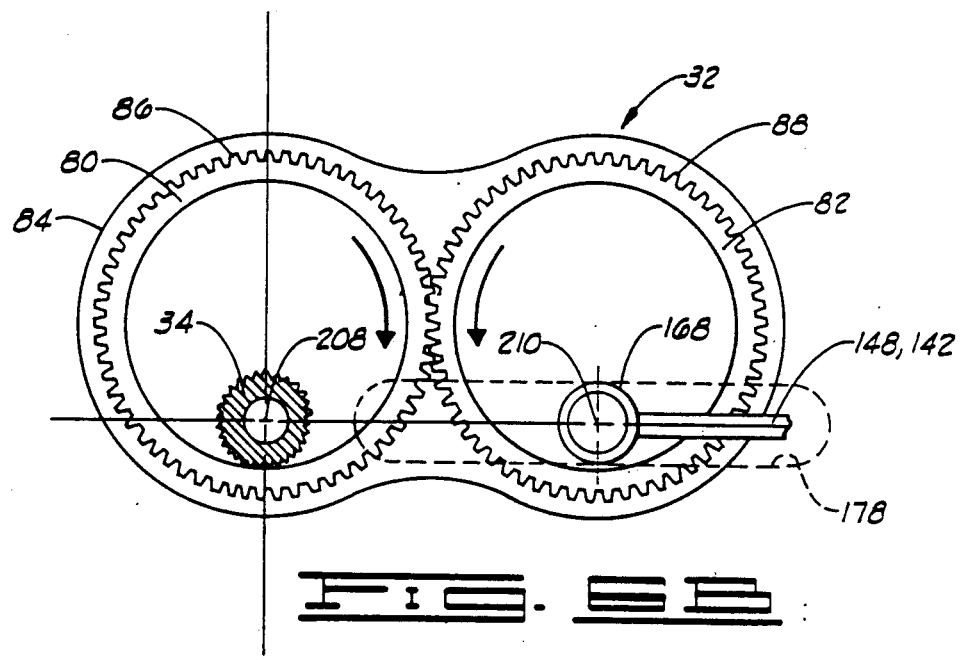
Figure 6C:
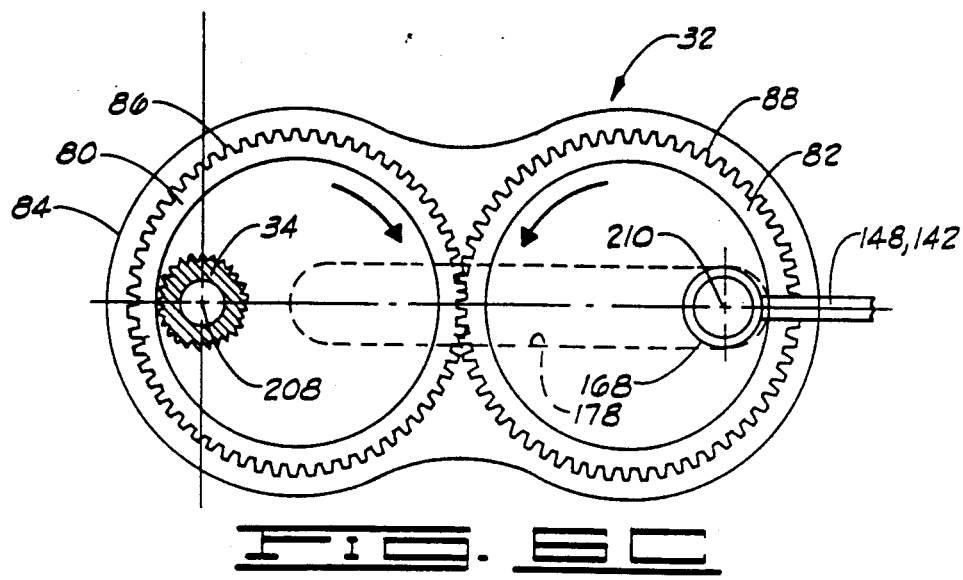

Referring now to FIGS. 6A-6C, the motion of gear assemblies 32 will be discussed. FIGS. 6A-6C show gear assembly 32 as it appears in several angles of rotation of drive shaft 34. In each of these figures, drive shaft 34 is shown as rotating about a center axis 208. It is important to note that center axis 208 is fixed with respect to drive case 12 and thus is shown in the same location in each of FIGS. 6A-6C. For clarity, the vertical center lines of center axis 208 in the figures are aligned.

In FIG. 6A, drive shaft 34 extending through drive gear 80 and cam roller 168 on driven gear 82 are at their closest location to one another. Because arm 148 of yoke assembly 142 is connected to driven gear 82 at the same point as cam roller 168, it will be seen that the position of gear assembly 32 shown in FIG. 6A corresponds to a bottom dead center position for plunger 28 with respect to cylinder 16. In the figures, drive shaft 34 is shown rotating in a clockwise direction as indicated by the arrow on drive gear 80. It will be seen by those skilled in the art that driven gear 82 thus rotates in a counterclockwise direction.

FIG. 6B shows gear assembly 32 in a position wherein drive shaft 34 has been rotated clockwise 90° from the position shown in FIG. 6A. In this position, yoke assembly 142, and thus plunger 28, have been moved away from drive shaft 34 and thus toward cylinder 16.

Because cam roller 168 rides in cam groove 178 of cam track 170, 172, 174, 176 or 178, the cam roller, and thus yoke assembly 142, cannot move vertically any substantial amount. That is, center axis 210 of cam roller 168 is substantially maintained in the same plane as center axis 208 of drive shaft 34. The only movement of center axis 210 is in this horizontal plane. Cam groove 178 in any of the cam tracks is, of course, fixed with respect to drive shaft 34.

In FIG. 6C, drive shaft 34 has been rotated another 90°, that is, 180° from the position shown in FIG. 6A. It will be seen that this corresponds to a top dead center position of yoke assembly 142 and plunger 28.

As previously described, drive gear 80 and driven gear 82 are mounted in gear case 84 on gear bearings 96 and 122, respectively. Those skilled in the art will see that the center lines of drive gear 80 and driven gear 82 are thus fixed in relationship to one another, and as the gears rotate with respect to one another, drive case 84 must move both vertically and horizontally. Thus, the position of gear case 84 in FIG. 6B is upwardly and to the right of the position shown in FIG. 6A. FIG. 6C shows gear case 84 moved back downwardly with respect to its position in FIG. 6B which is the same vertical position as in FIG. 6A. In FIG. 6C, gear case 84 is shown in its position furthest to the right with drive shaft 34 and cam roller 168 at the maximum distance apart. If drive shaft 34 is rotated a further 90° with respect to FIG. 6C, gear case 84 will move downwardly to a lowermost position which is basically an inversion of FIG. 6B. Rotating an additional 90° will bring gear assembly 32 back to the original position shown in FIG. 6A.

In the preferred embodiment, each of the three gear assemblies 32 shown in FIG. 2 are angularly staggered at 120° to maximize the balance on drive shaft 34 and drive case 12 in order to reduce vibration and provide smooth pumping. For a different number of gear assemblies, the angular relationship will vary accordingly.

It will be seen, therefore, that the eccentric gear pump of the present invention is well adapted to carry out the ends and advantages mentioned as well as those inherent therein. While a presently preferred embodiment of the apparatus has been shown for the purposes of this disclosure, numerous changes in the arrangement and construction of parts may be made by those skilled in the art. All such changes are encompassed within the scope and spirit of the appended claims.

What is claimed is:

1. A drive mechanism comprising:
   a first gear;
   a first shaft engaged eccentrically with said first gear;
   a second gear meshingly engaged with said first gear;
   a second shaft engaged eccentrically with said second gear;
   a cam track positioned adjacent to said second gear; and
   a cam on said second shaft and in guided engagement with said cam track.

2. The mechanism of claim 1 wherein said cam includes a roller for rolling along a surface of said cam track.

3. The mechanism of claim 1 wherein:
   said cam track is one of a pair of cam tracks disposed on opposite sides of said second gear; and
   said cam is one of a pair of cams disposed on opposite ends of said second shaft.

4. The mechanism of claim 1 wherein each of said gears has an annular shoulder thereon; and
   further comprising a side plate defining a pair of spaced openings therein, each opening being adapted for receiving a shoulder of a gear therein.

5. The mechanism of claim 4 wherein said plate is one of a pair of such plates disposed on opposite sides of said gears.

6. The mechanism of claim 4 wherein each opening has a bearing positioned therein for engagement with said shoulder of a corresponding gear.

7. The mechanism of claim 1 wherein the mechanism is installed in a gear case portion of a reciprocating pump and further comprising:
   a cylinder connected to said gear case;
   a plunger reciprocably disposed in said cylinder; and
   means for connecting said plunger to said second shaft.

8. A reciprocating pump comprising:
   a drive case;
   a drive shaft disposed in said drive case and having a portion extending therefrom;
   a cylinder connected to said drive case;
   a first eccentric gear disposed in said drive case and engaged with said drive shaft such that said first eccentric gear is rotatable therewith;
   a second eccentric gear disposed in said drive case and enmeshed with said first gear;
   a yoke pin engaged with said second eccentric gear;
   a plunger reciprocably disposed in said cylinder; and
   a yoke interconnecting said plunger and said yoke pin.

9. The pump of claim 8 wherein said yoke comprises:
   a pair of arms extending on opposite sides of said second eccentric gear and attached to said yoke pin; and
   a cross member connecting said arms and attached to said plunger.

10. The pump of claim 8 wherein axes of said drive shaft and said yoke pin are substantially coplanar.

11. The pump of claim 8 wherein:
each of said gears has an annular shoulder on a side thereof; and
further comprising a plate defining a pair of spaced openings therein, said plate being adjacent to said gears such that each of said shoulders extends into one of said openings whereby a distance between central axes of said gears is held substantially constant.

12. The pump of claim 11 wherein said plate is one of a pair of plates on opposite sides of said gears and forming a portion of a gear case at least partially enclosing said gears.

13. The pump of claim 11 further comprising bearing means for rotatably supporting each of said shoulders in the corresponding one of said openings.

14. The pump of claim 8 wherein said first eccentric gear, said second eccentric gear, said yoke pin and said yoke form a gear assembly which is one of a plurality of such gear assemblies engaged with said drive shaft and a plurality of corresponding plungers.

15. A reciprocating pump comprising:
a drive case;
a drive shaft disposed in said drive case and having a portion extending therefrom;
a cylinder connected to said drive case;
a first eccentric gear disposed in said drive case and engaged with said drive shaft such that said first eccentric gear is rotatable therewith;
a second eccentric gear disposed in said drive case and enmeshed with said first gear;
a yoke pin engaged with said second eccentric gear, wherein axes of said drive shaft and said yoke pin are substantially coplanar;
a plunger reciprocably disposed in said cylinder;
a yoke interconnecting said plunger and said yoke pin;
a cam roller rotatably attached to said yoke pin axially outwardly of said yoke; and
cam guide means for guiding said cam roller and maintaining movement of said yoke pin in substantially the same plane.

16. The pump of claim 13 wherein said cam guide means is characterized by an elongated cam track extending along a side of said second eccentric gear.

17. A reciprocating pump comprising:
a drive case;
a cylinder connected to said drive case;
a plunger reciprocably disposed in said cylinder;
a drive shaft rotatably disposed in said drive case;
a pair of enmeshed gears, one of said gears being eccentrically engaged by said drive shaft;
a second shaft eccentrically engaging the other of said gears;
means for connecting said second shaft and said plunger;
a gear case at least partially enclosing said gears; and
a lubrication line in communication with said gear case and connectable to a lubrication source.

18. The pump of claim 17 wherein said line is flexible.

19. The pump of claim 17 wherein said line has a swivel connection therein.

20. The pump of claim 17 further comprising means for substantially maintaining axes of said drive shaft and said second shaft in a single plane.

21. The pump of claim 17 further comprising means for maintaining a substantially constant spacing between central axes of said gears.

* * * * *